US009870534B1

(12) United States Patent
Wu et al.

(10) Patent No.: US 9,870,534 B1
(45) Date of Patent: Jan. 16, 2018

(54) PREDICTING NETWORK ACTIVITIES ASSOCIATED WITH A GIVEN SITE (71) Applicant: Nominum, Inc., Redwood City, CA (US)

(72) Inventors: Erik Wu, Marietta, GA (US); Peter Wisowaty, Palo Alto, CA (US); Edward Brown, San Francisco, CA (US)

(73) Assignee: Nominum, Inc., Redwood City, CA (US)

( * ) Notice: Subject to any disclaimer, the term of this patent is extended or adjusted under 35 U.S.C. 154(b) by 390 days.

(21) Appl. No.: 14/535,312

(22) Filed: Nov. 6, 2014

(51) Int. Cl.
*G06F 17/00* (2006.01)
*G06F 17/20* (2006.01)
*G06N 7/00* (2006.01)
*H04L 12/24* (2006.01)

(52) U.S. Cl.
CPC ............ *G06N 7/005* (2013.01); *H04L 41/147* (2013.01)

(58) Field of Classification Search
USPC .......................................................... 706/11
See application file for complete search history.

(56) References Cited

U.S. PATENT DOCUMENTS

| 5,978,568 | A | 11/1999 | Abraham et al. |
| 6,396,830 | B2 | 5/2002 | Aravamudan et al. |
| 6,493,551 | B1 | 12/2002 | Wang et al. |
| 6,687,245 | B2 | 2/2004 | Fangman et al. |
| 6,961,783 | B1 | 11/2005 | Cook et al. |
| 7,046,659 | B1 | 5/2006 | Woundy |
| 7,188,175 | B1 | 3/2007 | McKeeth |
| 7,594,260 | B2 * | 9/2009 | Porras ............... H04L 41/142 709/224 |
| 7,600,042 | B2 | 10/2009 | Lemson et al. |
| 7,840,699 | B2 | 11/2010 | Fujita et al. |
| 8,015,271 | B2 | 9/2011 | McKeown et al. |
| 8,095,685 | B2 | 1/2012 | Mattila |
| 8,549,118 | B2 | 10/2013 | Ringen |
| 8,554,933 | B2 | 10/2013 | Delos Reyes et al. |
| 8,656,026 | B1 | 2/2014 | Prasad et al. |
| 8,707,429 | B2 | 4/2014 | Wilbourn et al. |

(Continued)

OTHER PUBLICATIONS

Wentao Zhao, Jianping Yin, Jun Long, "A Prediction Model of DoS Attack's Distribution Discrete Probability", Web-Age Information Management, 2008. WAIM '08. The Ninth International Conference on, Jul. 20, 2008, pp. 625-628.*

(Continued)

*Primary Examiner* — Michael B Holmes
(74) *Attorney, Agent, or Firm* — Carr & Ferrell LLP (57) ABSTRACT

A method predicting a network activity associated with a given network site is provided. The method can include receiving a request to predict a probability of network activity associated with the network site, analyzing historical data associated with the network site, and, based on the analysis, determining the probability of the network activity in future. The method can further include monitoring the network site, ascertaining evidence associated with the network activity, and, based on the evidence, adjusting treatment of the network site. Additionally, the method can include comparing the probability to a predetermined threshold probability and, based on the comparison, selectively taking an action concerning the network site.

17 Claims, 5 Drawing Sheets

(56) References Cited

U.S. PATENT DOCUMENTS

| | | | |
|---|---|---|---|
| 8,744,367 B2* | 6/2014 | Gerber | H04W 76/068 370/465 |
| 8,762,506 B2 | 6/2014 | Courtney et al. | |
| 8,769,060 B2 | 7/2014 | Avirneni et al. | |
| 8,788,654 B2* | 7/2014 | Hildebrand | H04L 41/0806 709/224 |
| 8,806,629 B1* | 8/2014 | Cherepov | H04L 63/1416 726/23 |
| 8,874,662 B2 | 10/2014 | Graham et al. | |
| 8,996,669 B2 | 3/2015 | Liu et al. | |
| 9,058,381 B2 | 6/2015 | Thomas | |
| 9,083,562 B2* | 7/2015 | Bates | H04L 41/147 |
| 9,215,123 B1 | 12/2015 | Fears et al. | |
| 9,220,066 B2* | 12/2015 | Gerber | H04L 67/26 |
| 9,374,824 B2* | 6/2016 | Gerber | H04W 76/068 |
| 9,396,444 B2* | 7/2016 | Bates | G06Q 30/02 |
| 9,686,275 B2 | 6/2017 | Chari et al. | |
| 9,699,737 B2* | 7/2017 | Gerber | H04W 52/0251 |
| 2001/0034759 A1 | 10/2001 | Chiles et al. | |
| 2001/0043595 A1 | 11/2001 | Aravamudan et al. | |
| 2001/0044903 A1 | 11/2001 | Yamamoto et al. | |
| 2002/0143705 A1 | 10/2002 | Kaars | |
| 2003/0177236 A1 | 9/2003 | Goto et al. | |
| 2005/0060535 A1 | 3/2005 | Bartas | |
| 2005/0102529 A1 | 5/2005 | Buddhikot et al. | |
| 2005/0111384 A1 | 5/2005 | Ishihara et al. | |
| 2005/0125195 A1* | 6/2005 | Brendel | H04L 43/00 702/182 |
| 2005/0276272 A1 | 12/2005 | Arai | |
| 2006/0020525 A1 | 1/2006 | Borelli et al. | |
| 2006/0062228 A1 | 3/2006 | Ota et al. | |
| 2006/0168065 A1 | 7/2006 | Martin | |
| 2007/0058792 A1 | 3/2007 | Chaudhari et al. | |
| 2007/0079379 A1 | 4/2007 | Sprosts et al. | |
| 2007/0088815 A1 | 4/2007 | Ma et al. | |
| 2008/0259941 A1 | 10/2008 | Zhao et al. | |
| 2009/0067331 A1 | 3/2009 | Watsen et al. | |
| 2009/0129301 A1 | 5/2009 | Belimpasakis | |
| 2009/0144419 A1 | 6/2009 | Riordan et al. | |
| 2009/0253404 A1 | 10/2009 | Alston et al. | |
| 2009/0282028 A1 | 11/2009 | Subotin et al. | |
| 2009/0282038 A1 | 11/2009 | Subotin et al. | |
| 2009/0296567 A1 | 12/2009 | Yasrebi et al. | |
| 2010/0030914 A1 | 2/2010 | Sparks et al. | |
| 2010/0106854 A1 | 4/2010 | Kim et al. | |
| 2010/0121981 A1 | 5/2010 | Drako | |
| 2010/0131646 A1 | 5/2010 | Drako | |
| 2010/0211628 A1 | 8/2010 | Shah | |
| 2010/0217837 A1 | 8/2010 | Ansari et al. | |
| 2010/0303009 A1 | 12/2010 | Liu | |
| 2011/0213967 A1 | 9/2011 | Wnuk | |
| 2011/0246634 A1 | 10/2011 | Liu et al. | |
| 2011/0296171 A1 | 12/2011 | Fu et al. | |
| 2011/0296172 A1 | 12/2011 | Fu et al. | |
| 2012/0036241 A1 | 2/2012 | Jennings et al. | |
| 2012/0178416 A1 | 7/2012 | Miklos et al. | |
| 2012/0198034 A1 | 8/2012 | Avirneni et al. | |
| 2012/0246315 A1 | 9/2012 | Kagan | |
| 2012/0254996 A1 | 10/2012 | Wilbourn et al. | |
| 2013/0333016 A1 | 12/2013 | Coughlin et al. | |
| 2014/0052984 A1 | 2/2014 | Gupta | |
| 2014/0123222 A1 | 5/2014 | Omar | |
| 2016/0099961 A1 | 4/2016 | Paugh et al. | |

OTHER PUBLICATIONS

Andrew W. Moore, Denis Zuev, "Internet Traffic Classification Using Bayesian Analysis Techniques", SIGMETRICS '05 Proceedings of the 2005 ACM SIGMETRICS international conference on Measurement and modeling of computer systems, ACM SIGMETRICS Performance Evaluation Review—Performance evaluation review, vol. 33 Issue 1, Jun. 2005, pp. 50-60.*

Saman Taghavi Zargar, James Joshi and David Tipper, "A Survey of Defense Mechanisms Against Distributed Denial of Service (DDoS) Flooding Attacks", IEEE Communications Surveys & Tutorials ( vol. 15, Issue: 4, Fourth Quarter 2013 ), 2013, pp. 2046-2069.*

Jun Zhang, Chao Chen, Yang Xiang, Wanlei Zhou, "Internet Traffic Classification by Aggregating Correlated Naive Bayes Predictions", IEEE Transactions on Information Forensics and Security ( vol. 8, Issue: 1, Jan. 2013 ), 2013, pp. 5-15.*

Social restricted Boltzmann Machine: Human behavior prediction in health social networks NhatHai Phan; Dejing Dou; Brigitte Piniewski; David Kil 2015 IEEE/ACM International Conference on Advances in Social Networks Analysis and Mining (ASONAM) Year: 2015 pp. 424-431 IEEE Conference Publications.*

Collaborative Scheduling in Dynamic Environments Using Error Inference Qingquan Zhang; Lingkun Fu; Yu Jason Gu; Lin Gu; Qing Cao; Jiming Chen; Tian He IEEE Transactions on Parallel and Distributed Systems Year: 2014, vol. 25, Issue: 3 pp. 591-601 IEEE Journals & Magazines.*

Spectrum Prediction in Cognitive Radio Networks: A Bayesian Approach Jaison Jacob; Babita R. Jose; Jimson Mathew 2014 Eighth International Conference on Next Generation Mobile Apps, Services and Technologies Year: 2014 pp. 203-208 IEEE Conference Publications.*

On-line diagnosis of a power generation process using probabilistic models Pablo H. Ibargüengoytia; Alberto Reyes 2011 16th International Conference on Intelligent System Applications to Power Systems Year: 2011 pp. 1-6 IEEE Conference Publications.*

Non-Final Office Action, dated Jul. 3, 2012, U.S. Appl. No. 12/753,827, filed Apr. 2, 2010.

Final Office Action, dated Apr. 24, 2013, U.S. Appl. No. 12/753,827, filed Apr. 2, 2010.

Non-Final Office Action, dated Jun. 23, 2014, U.S. Appl. No. 12/753,827, filed Apr. 2, 2010.

Final Office Action, dated Sep. 24, 2014, U.S. Appl. No. 12/753,827, filed Apr. 2, 2010.

Notice of Allowance, dated Jan. 9, 2015, U.S. Appl. No. 12/753,827, filed Apr. 2, 2010.

Non-Final Office Action, dated Feb. 11, 2013, U.S. Appl. No. 13/077,934, filed Mar. 31, 2011.

Notice of Allowance, dated Nov. 25, 2013, U.S. Appl. No. 13/077,934, filed Mar. 31, 2011.

Notice of Allowance, dated Jan. 30, 2014, U.S. Appl. No. 13/016,832, filed Jan. 28, 2011.

Non-Final Office Action, dated Jan. 21, 2015, U.S. Appl. No. 13/839,331, filed Mar. 15, 2013.

Notice of Allowance, dated Jul. 24, 2015, U.S. Appl. No. 13/839,331, filed Mar. 15, 2013.

Non-Final Office Action, dated Jul. 28, 2015, U.S. Appl. No. 14/266,557, filed Apr. 30, 2014.

Park, Jeong-Hyun, "Wireless Internet Access for Mobile Subscribers Based on the GPRS/UMTS Network," Communications Magazine, IEEE, vol. 40, No. 4, pp. 38-49, Apr. 2002.

Vixie et al., "Secret Key Transaction Authentication for DNS (TSIG)," Network Working Group, May 2000, http://tools.ietf.org/pdf/rfc2845.pdf.

Messaging Anti-Abuse Working Group, Methods for Sharing Dynamic IP Address Space Information with Others, 2008, retrieved online Jul. 20, 2015; avaialble at: <https://www.m3aawg.org/sites/default/files/document_MAAWG_Dynamic_Space_2008-06.pdf>.

Final Office Action dated Jan. 29, 2016, U.S. Appl. No. 14/266,557, filed Apr. 30, 2014.

* cited by examiner

PREDICTING NETWORK ACTIVITIES ASSOCIATED WITH A GIVEN SITE

FIELD

This application relates generally to data processing and, more specifically, to systems and methods for predicting network activities associated with a given site.

BACKGROUND

Predicting network activity helps service providers and enterprises manage and react to change within their systems. For example, one of the most pressing problems the Internet community faces today is network activity that enables attackers to gain unauthorized access to resources or disrupt services of a network site. Network acts performed over a network can include various Distributed Denial of Service (DDoS) attacks, spamming, financial information theft, misdirected queries, and so forth. To prevent such network activity, network operators and other organizations can monitor traffic and detect suspicious network activity that is associated with network attacks. Service providers or enterprises can also use predictions of network activity to enhance the user experience.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer implemented methods and systems for predicting network activity associated with a given network site. Using the methods or systems described herein, a service provider or an enterprise can selectively investigate and/or monitor a network site based on a probability that the network site will be involved in a specific network activity in the future.

The service provider or enterprise can send a request to the system for predicting a network activity with a network site. The system for predicting network activity can retrieve historical data related to the activity of the network site and analyze the historical data for signs of past network activities. Based on the analysis, a probability of future network site participation in the network activity can be determined.

In some embodiments, the probability is further determined based on certain environmental parameters (for example, a name of a domain associated with the network site, a malware risk associated with the network site, a general speed of network traffic, related network sites, and so forth).

To confirm the probability, activities of the network site can be monitored during a specific time period. If the monitoring results in evidence of the network activity, the network activity is confirmed. Furthermore, the calculated probability can be reevaluated and refreshed based on the received evidence.

If the probability of a network activity occurring exceeds a predefined threshold, actions ranging from notifying the service provider or enterprise to blocking, redirecting or providing interstitial activities relating to the network site can be taken. In some embodiments, the performed action depends on the value of the probability of the network activity.

The resulting data, which can include a domain name of the network site, a time range of the historical analysis and/or monitoring, the probability value, the network action associated with the network site, confirmation of the network activity, and so forth, can be graphically presented to a user on a graphical user interface or presented as a report, sent via e-mail, provided for downloading, and so forth.

In further exemplary embodiments, modules, subsystems, or devices can be adapted to perform the recited steps. Other features and exemplary embodiments are described below.

BRIEF DESCRIPTION OF THE DRAWINGS

Embodiments are illustrated by way of example and not limitation in the figures of the accompanying drawings, in which like references indicate similar elements.

DETAILED DESCRIPTION

Network operators or enterprises can employ a variety of tools to manage and react to network activity, which can range from a malicious activity, such as spamming, to a Distributed Denial of Service (DDoS) attacks, misdirected queries, and actions of misconfiguration, such as traffic shaping, traffic redirection, interstitial activity, file downloading, association with further network sites, synchronization time with the further network sites, and so forth. A network activity can be associated with one or more domain names. Domain names are used to operate malicious networks (for example, bonnet). Conventional methods of tracking network activity have proved inefficient because of the quantity of existing domains.

Provided are methods and systems for predicting network activities associated with a network site based on historical data associated with a domain name of the network site.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, and other embodiments can be formed, by introducing structural and logical changes without departing from the scope of what is claimed. The following detailed description is, therefore, not to be taken in a limiting sense and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Figure 1:
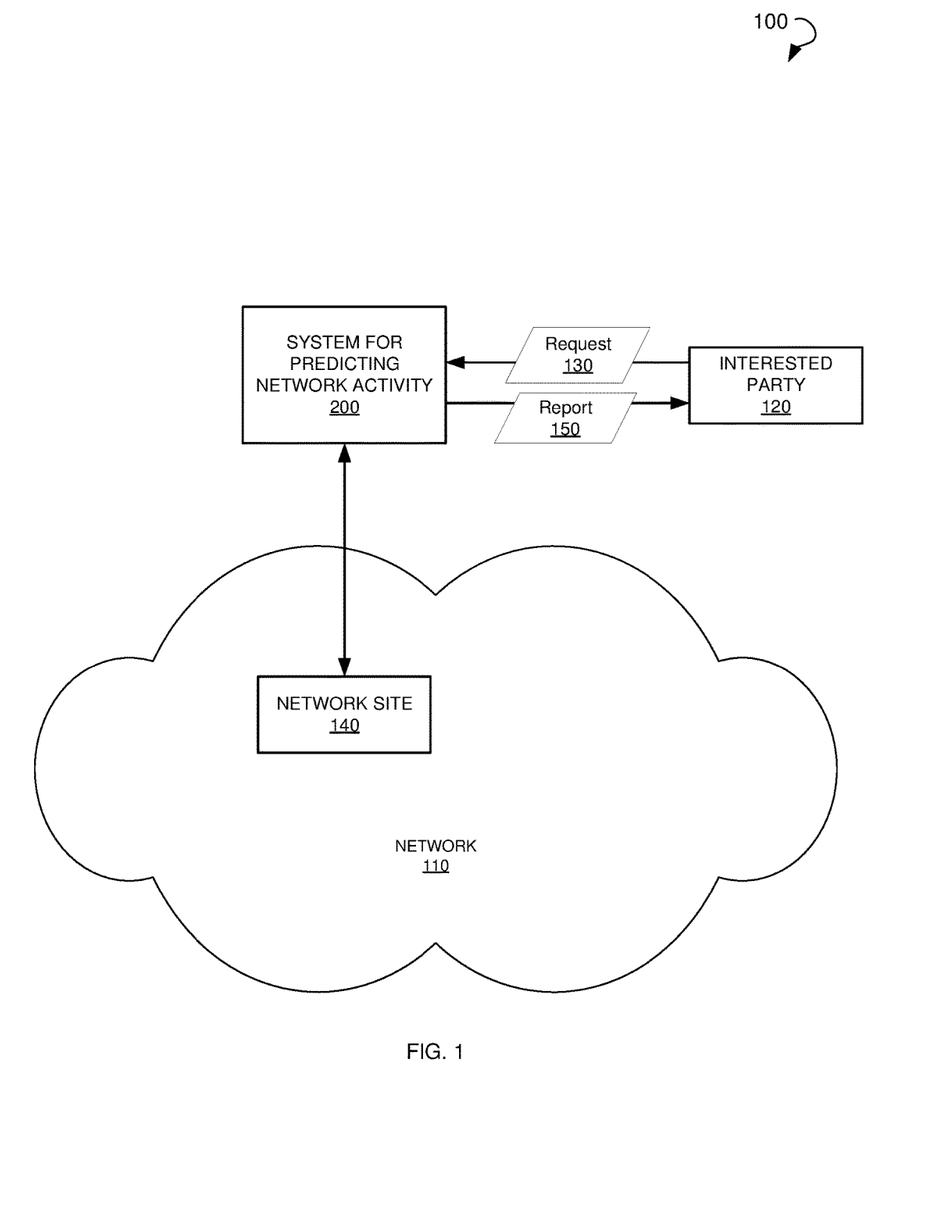
FIG. 1 is a block diagram showing an environment within which methods and systems for predicting network activities associated with a given network site can be implemented.

FIG. 1 is a block diagram of various components of an environment 100 within which the methods and systems for predicting network activity associated with a network site may be implemented, in accordance with various embodiments. The environment 100 shows a system 200 for predicting a network activity. The system 200 can be used to detect network sites associated with network activity based on historical data of such network sites. An interested party 120, for example, a service provider or an enterprise, can send a request 130 to the system 200 in order to determine a probability that a network site 140 is involved in network activity in future. The network activity can include misdirected queries and malicious activity, such as spamming, identity theft, a DDoS attack, a Domain Name Service (DNS) Amplification DDoS attack, a subdomain DDoS attack, and actions of misconfiguration, such as traffic redirection, interstitial activity, file downloading, association with further network sites, synchronization time with the further network sites, and so forth.

The network site 140 resides and acts in a network 110. The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, an IEEE 802.11-based radio frequency network, or a worldwide interoperability for microwave access (WiMAX) network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a Universal Serial Bus (USB) connection or other wired or wireless, digital or analog interface or connection, mesh or Digi® networking. The network 110 may include any suitable number and type of devices (e.g., routers and switches) for forwarding commands, content, and/or web object requests from each client to the online community application and responses back to the clients.

The system 200 obtains and analyzes historical data associated with the network site 140 (for example, activity related to the network site 140). The purpose of the analysis is to determine the probability of the network activity for the network site 140 in future. If the probability exceeds a predetermined threshold, further actions can be performed by the system 200. In some embodiments, the system 200 sends a report 150 on the probability of network activity associated with the network site 140 to the interested party 120.

Figure 2:
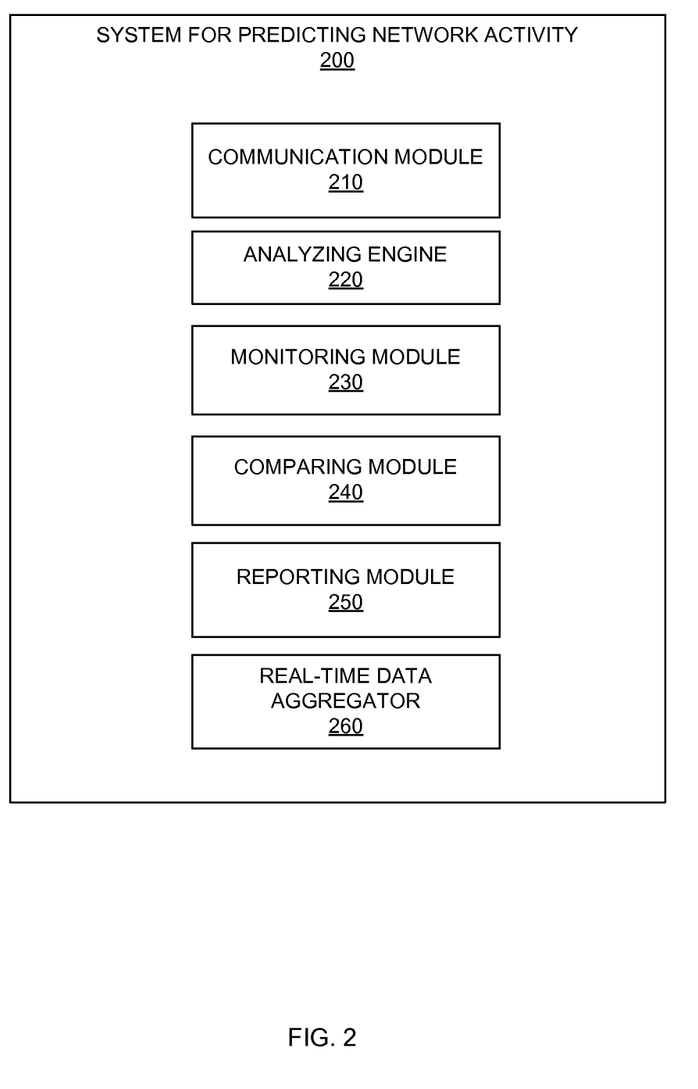
FIG. 2 is a block diagram showing various modules of the system for predicting network activities associated with a given network site.

FIG. 2 is a block diagram of the system 200 for predicting network activity associated with a network site. Alternative embodiments of the system 200 may include more, fewer, or functionally equivalent modules. In some exemplary embodiments, the system 200 includes a communication module 210, an analyzing engine 220, a monitoring module 230, a comparing module 240, a reporting module 250, and a real-time data aggregator 260. It will be appreciated by one of ordinary skill that examples of the foregoing modules may be virtual and when instructions are said to be executed by a module they may, in fact, be retrieved and executed by a processor. The foregoing modules may also include memory cards, servers, and/or computer discs. Although various modules may be configured to perform some or all of the various steps described herein, fewer or more modules may be provided and still fall within the scope of various embodiments.

The communication module 210 can be configurable to provide a communication channel between the system 200 and various components of the environment 100, including but not limited to, the interested party 120, network 110, and a network site 140. Additionally, the communication module 210 may enable direct exchange of information between various modules of the system 200.

The analyzing engine 220 is used for analyzing historical data, logs, messages, logins, and timing to detect signs of network activity and/or associated events. The findings are used to determine the likelihood of the site being employed for network actions. For example, it may be determined that the probability of the network activity associated with the network site is 60%.

The monitoring module 230 can be configurable to monitor the network site and its activity during a specific time range. The time range can be specified by the interested party, automatically determined by the system 200, or dynamically adjusted according to the findings of the monitoring. Thus, the monitoring module 230 can ascertain an evidence of the network activity and give a confirmation of the network activity. Furthermore, the monitoring module 230 can adjust treatment of the network site.

The comparing module 240 can compare the determined probability to a predetermined threshold probability. If the determined probability is equal to or exceeds a predetermined threshold probability, the reporting module 250 can report the probability, warn an interested party and/or an operator, perform a further investigation of the network site, block the network site, redirect network traffic associated with the network site, and so forth. The reporting module 250 can report substantially real-time network traffic data to the real-time data aggregator 260.

Figure 3:
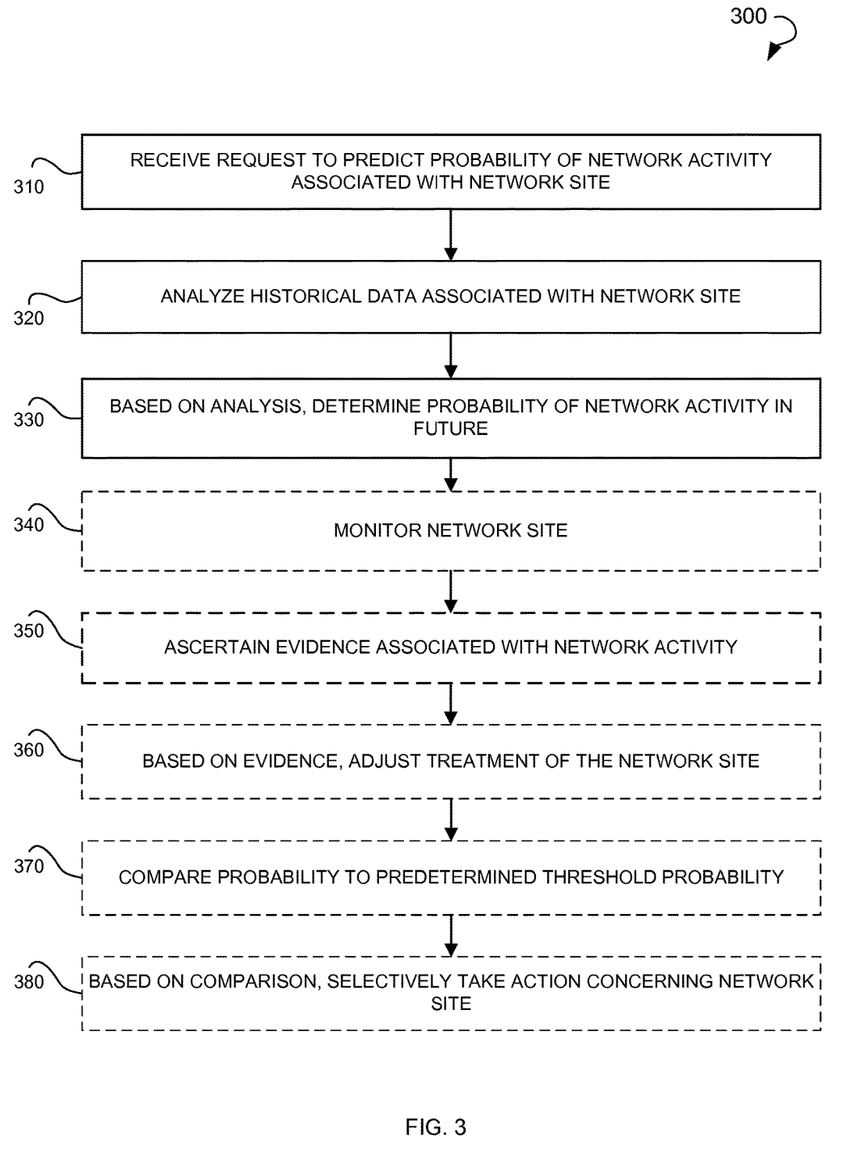
FIG. 3 is a flow chart illustrating a method for predicting network activities associated with a given network site.
Figure 5:
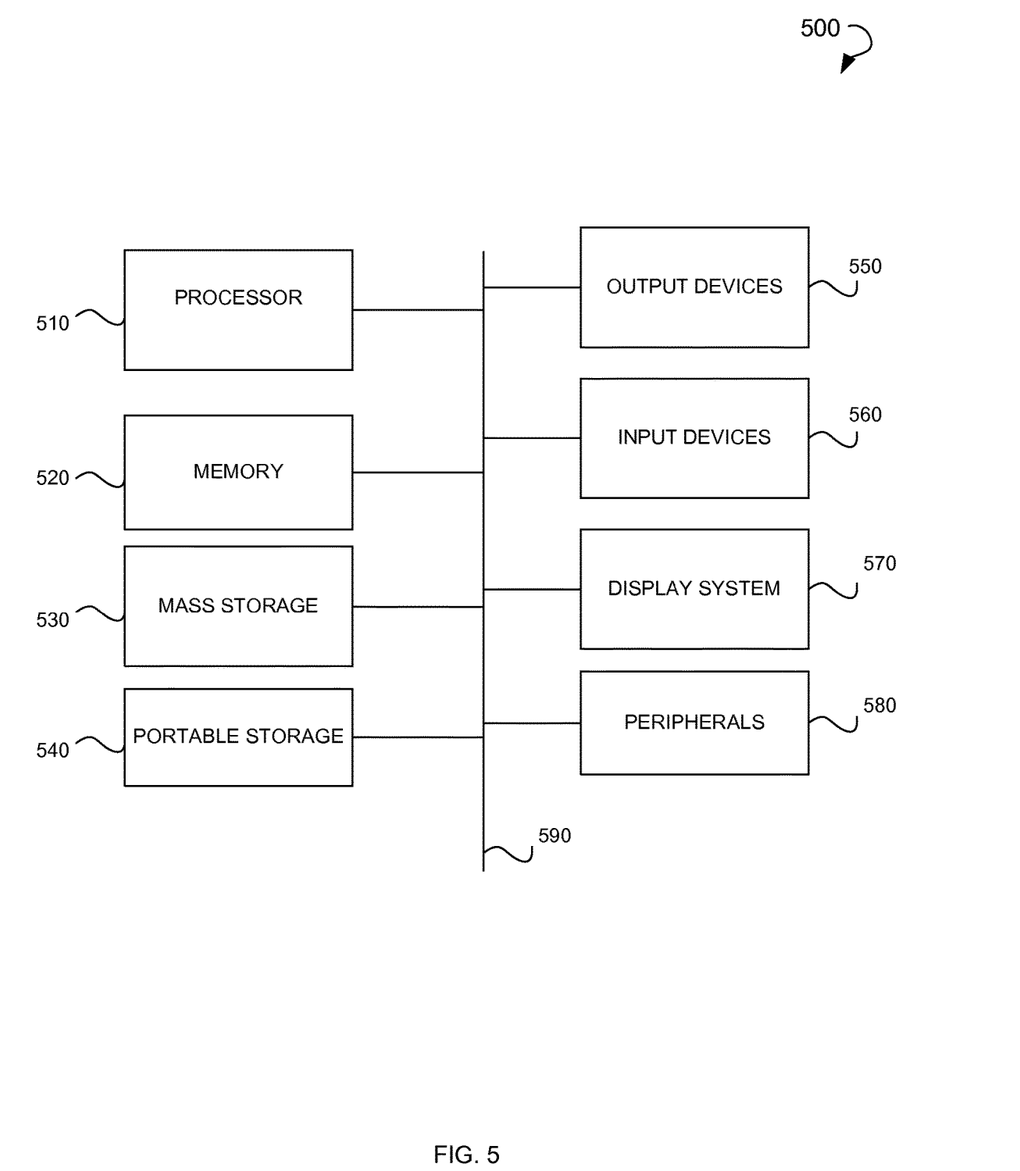
FIG. 5 shows a diagrammatic representation of a computing device for a machine in the exemplary electronic form of a computer system, within which a set of instructions for causing the machine to perform any one or more of the methodologies discussed herein, can be executed.

FIG. 3 illustrates a flow chart of a method 300 for predicting probability of network activity associated with a network site, in accordance with various embodiments. The method 300 may be performed by processing logic that may comprise hardware (e.g., dedicated logic, programmable logic, microcode, etc.), software (such as run on a general-purpose computer system or a dedicated machine), or a combination of both. In one exemplary embodiment, the processing logic resides at one or more processors, as illustrated in FIG. 5.

The method 300 may commence at operation 310 with the communication module receiving a request from the interested party, such as a service provider or an enterprise. The request can be associated with a specific network site. At operation 320, historical data associated with the network site can be obtained and analyzed. The historical data can include information about one or more past network activities, or known network actions associated with the network site. If the analysis reveals signs of network activity, the findings are analyzed to determine the probability of network activity in which the network site is involved, at operation 330. For example, it can be determined that the probability is 30%, 50%, 80%, and so forth.

Optionally, the method can continue with operation 340. To avoid false positive determination of a network site as a source of network activity, the monitoring module can monitor the network site for a predefined period of time at operation 340. For example, a spam mitigation solution may accidentally block legitimate email traffic. There are a variety of measures that may be taken within the system 200 to confirm the determined probability. If there is a possibility that the network site has some legitimate purpose, no action will be taken but the site will instead be monitored until the level of certainty approaches a predetermined level.

Thus, the monitoring module can monitor requests, messages, logins, and other network activities related to the network site, as well as misdirected queries to the network site. During the monitoring, one or more evidences associated with the network activity can be ascertained at operation 350. The evidences can include specific actions performed on behalf of the network site in specific time, and so forth. In some embodiments, the probability determined at operation 330 can be reevaluated based on the evidence. Additionally, once the evidences are ascertained, a treatment of the network site can be adjusted at operation 360.

In some embodiments, further factors, such as environmental parameters, can be considered to adjust the probability. The environmental parameters can include one or more of the following: a name of a domain associated with the network site, an association with a further network site, a correlation between the network site and the further network site, a malware risk associated with the network site, an activity associated with the network site, a general security state, related network sites, and a speed of network traffic.

At operation 370, the probability can be compared to a predetermined threshold probability. For example, the predetermined threshold probability can be set to 50%. If the determined and/or reevaluated probability exceeds the predetermined threshold probability, an action can be taken at operation 380. The action includes one or more of the following: reporting the probability, warning the interested party, performing a further investigation of the network site, blocking the network site, redirecting network traffic associated with the network site, and so forth. The action to take can be selected based on the probability value. For example, the specific actions can be associated with certain probability values. In some example embodiments, if the probability is determined to be 80%, the network site is blocked, while a probability determined to be 60% triggers a warning to the interested party.

In some embodiments, the probability is reported by providing a graphic representation of attributes associated with the network activity. For example, the attributes can be displayed via a graphical user interface of the system 200. In further embodiments, the probability can be reported by presenting a report to an interested party. The report can be sent via e-mail, provided for downloading, and so forth.

Figure 4:
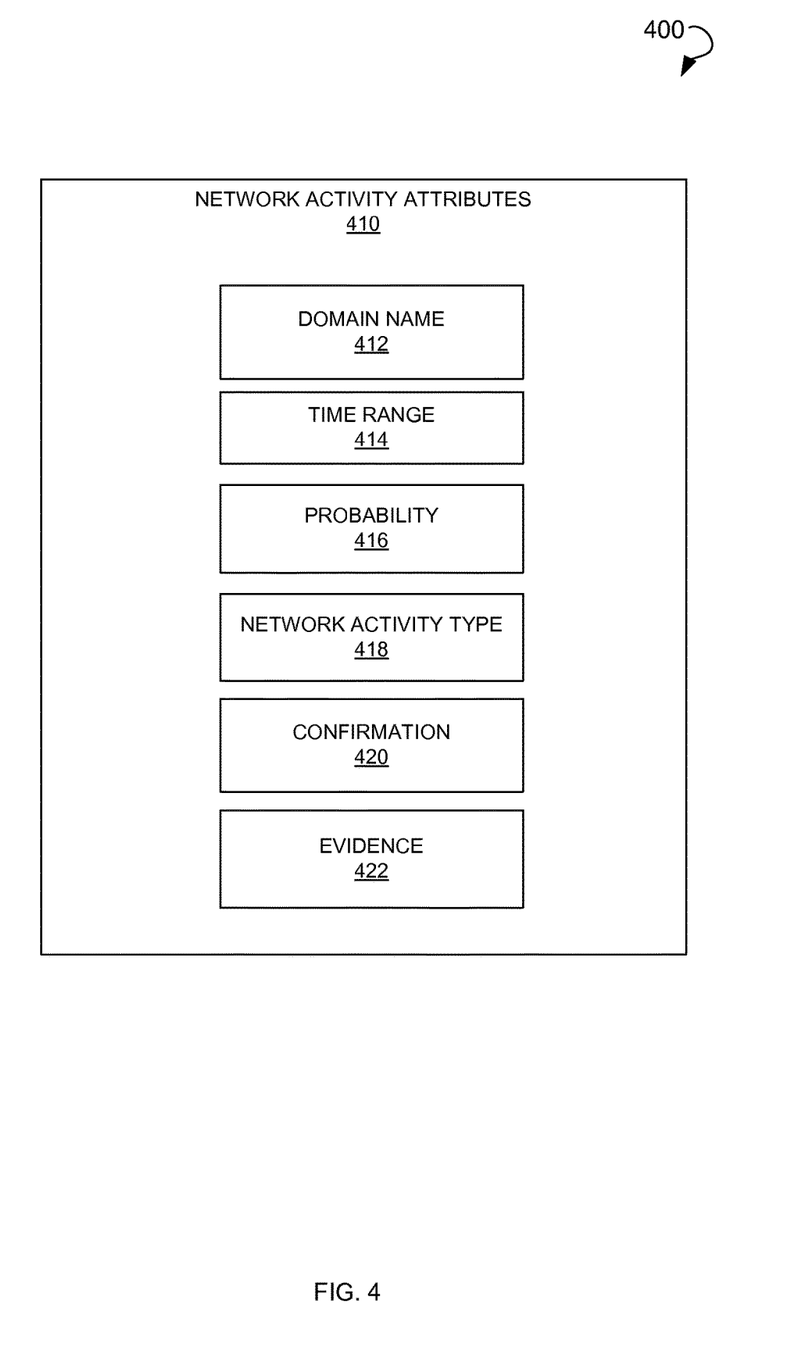
FIG. 4 is an example representation of network activity attributes.

An example representation 400 of network activity attributes 410 is shown in FIG. 4. The graphical representation of network activity attributes 410 can include a domain name 412 of the network site for which the probability is determined, a time range 414 for monitoring the network site, and the determined probability 416 of the network activity type 418 associated with the network site. Additionally, the representation 400 can show a network activity type 418 associated with the network site (for example, misdirected queries and malicious activity, such as spamming, DDoS attack, DNS Amplification DDoS attack, a subdomain DDoS attack, and actions of misconfiguration, such as traffic redirection, interstitial activity, traffic shaping, file downloading, association with further network sites, synchronization time with the further network sites, and so forth). Furthermore, the representation 400 can include a confirmation 420 that the network site has taken part in the network activity and evidence 422 obtained as a result of monitoring the network site and confirming the network activity. In various embodiments, the representation 400 can include additional attributes or show a reduced list of attributes.

FIG. 5 illustrates an exemplary computing system 500 (also referred to herein as computer system 500) that may be used to implement an embodiment of the present disclosure. Computer system 500 of FIG. 5 may be implemented in the context of network devices and the like. The computing system 500 of FIG. 5 includes one or more processors 510 and main memory 520. Main memory 520 stores, in part, instructions and data for execution by processor 510. Main memory 520 can store the executable code when the computing system 500 is in operation. The computing system 500 of FIG. 5 may further include a mass storage device 530, portable storage medium drive(s) 540, output devices 550, user input devices 560, a display system 570, and other peripheral devices 580 (also referred to herein as peripheral(s) 580).

The components shown in FIG. 5 are depicted as being connected via a single bus 590. The components may be connected through one or more data transport means. Processor 510 and main memory 520 may be connected via a local microprocessor bus, and the mass storage device 530, peripheral device(s) 580, portable storage medium drive 540, and display system 570 may be connected via one or more input/output (I/O) buses.

Mass storage device 530, which may be implemented with a magnetic disk drive or an optical disk drive, is a non-volatile storage device for storing data and instructions for use by processor 510. Mass storage device 530 can store the system software for implementing embodiments of the disclosed technology for purposes of loading that software into main memory 520.

Portable storage medium drive 540 operates in conjunction with a portable non-volatile storage medium, such as a floppy disk, compact disk (CD), or digital video disc (DVD), to input and output data and code to and from the computer system 500 of FIG. 5. The system software for implementing embodiments of the present disclosure may be stored on such a portable medium and input to the computer system 500 via the portable storage medium drive 540.

Input devices 560 provide a portion of a user interface. Input devices 560 may include an alphanumeric keypad, such as a keyboard, for inputting alphanumeric and other information, or a pointing device, such as a mouse, trackball, stylus, or cursor direction keys. Additionally, the computing system 500 as shown in FIG. 5 includes output devices 550. Suitable output devices include speakers, printers, network interfaces, and monitors.

Display system 570 may include a liquid crystal display (LCD) or other suitable display device. Display system 570 receives textual and graphical information and processes the information for output to the display device.

Peripheral device(s) 580 may include any type of computer support device to add additional functionality to the computer system. Peripheral device(s) 580 may include a modem or a router.

The components contained in the computer system 500 of FIG. 5 are those typically found in computer systems that may be suitable for use with embodiments of the disclosed technology and are intended to represent a broad category of such computer components that are well known in the art. Thus, the computer system 500 of FIG. 5 can be a PC, hand held computing device, telephone, mobile computing device, workstation, server, minicomputer, mainframe computer, or any other computing device. The computer can also include different bus configurations, networked platforms, multi-processor platforms, and so forth. Various operating systems (OSs) can be used, including UNIX, Linux, Windows, Macintosh OS, Palm OS, Android, and other suitable operating systems.

Some of the above-described functions may be composed of instructions that are stored on storage media (e.g., a computer-readable medium). The instructions may be retrieved and executed by the processor. Some examples of storage media are memory devices, tapes, disks, and the like. The instructions are operational when executed by the processor to direct the processor to operate in accord with the disclosed technology. Those skilled in the art are familiar with instructions, processor(s), and storage media.

It is noteworthy that any hardware platform suitable for performing the processing described herein is suitable for use with the disclosed technology. The terms "computer-readable storage medium" and "computer-readable storage media" as used herein refer to any medium or media that participate in providing instructions to a Central Processing Unit (CPU) for execution. Such media can take many forms, including, but not limited to, non-volatile media, volatile media and transmission media. Non-volatile media include, for example, optical or magnetic disks, such as a fixed disk. Volatile media include dynamic memory, such as system Random Access Memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents. While the present invention has been described in connection with a series of embodiments, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or subcombinations. Each of these processes or steps may be implemented in a variety of different ways. Also, while processes or steps are at times shown as being performed in series, these processes or steps may instead be performed in parallel, or may be performed at different times.

From the foregoing, it will be appreciated that specific embodiments of the system have been described herein for purposes of illustration, but that various modifications may be made without deviating from the spirit and scope of the system. Accordingly, the system is not limited except as by the appended claims.

What is claimed is:

1. A computer-implemented method for predicting a network activity associated with a network site, the method comprising:
    receiving a request from an interested party to predict a probability of the network activity associated with the network site;
    analyzing historical data associated with a domain name of the network site, the historical data including one or more past network activities associated with the network site;
    based on the analysis of the historical data for the domain name, determining the probability of the network activity on the network site in future;

comparing the probability to a predetermined threshold probability; and based on the comparison, selectively taking a variable action concerning the network site.

2. The method of claim 1, further comprising:

monitoring the network site after taking the selective variable action;

ascertaining an evidence associated with the network activity; and based on the evidence, adjusting the selective variable action for the network site.

3. The method of claim 2, further comprising reevaluating the probability based on the evidence.

4. The method of claim 1, wherein the selective variable action includes at least one of reporting the probability, warning the interested party, performing a further investigation of the network site, blocking the network site, and redirecting network traffic associated with the network site.

5. The method of claim 1, wherein the interested party is a service provider or an enterprise.

6. The method of claim 4, wherein the reporting the probability includes providing a graphic representation of attributes associated with the network activity for the network site, and presenting a report to the interested party.

7. The method of claim 6, wherein the attributes associated with the network activity include at least two of the domain name, a time range, the probability, a network action, a confirmation, and an evidence.

8. The method of claim 1, wherein the network activity associated with the network site is at least one of spamming, a Distributed Denial of Service (DDoS) attack, a Domain Name Service (DNS) Amplification DDoS attack, a subdomain DDoS attack, traffic shaping, traffic redirection, interstitial activity, file downloading, association with further network sites, and synchronization time with the further network sites.

9. The method of claim 1, wherein the probability of the network activity is further based on environmental parameters, the environmental parameters including at least one of a name of a domain associated with the network site, an association with a further network site, a correlation between the network site and the further network site, a malware risk associated with the network site, an activity associated with the network site, a general security state, and a speed of network traffic.

10. A system for predicting a network activity associated with a network site, the system comprising:

a communication module operable to receive a request from an interested party to predict a probability of network activity associated with the network site;

an analyzing engine operable to analyze historical data associated with a domain name of the network site and, based on the analysis of the historical data for the domain name, determine the probability of the network activity on the network site in future;

a comparing module operable to compare the probability to a predetermined threshold probability; and a reporting module, based on the comparison, operable to selectively take a variable action concerning the network site.

11. The system of claim 10, further comprising a monitoring module operable to monitor the network site after taking the selective variable action, ascertain evidence associated with the network activity, and based on the evidence, adjust the selective variable action for the network site.

12. The system of claim 11, wherein the analyzing engine is further operable to reevaluate the probability based on the evidence.

13. The system of claim 10, further comprising the reporting module operable to report substantially real-time network traffic data to a real-time data aggregator.

14. The system of claim 10, wherein the selective variable action includes at least one of reporting the probability, warning the interested party, performing a further investigation of the network site, blocking the network site, and redirecting network traffic associated with the network site.

15. The system of claim 10, wherein the interested party is a service provider or an enterprise.

16. The system of claim 14, wherein the reporting the probability includes providing a graphic representation of attributes associated with the network activity for the network site and presenting a report to the interested party, wherein the attributes include two or more of the following: the domain name, a time range, the probability, a network action, a confirmation, and an evidence.

17. A machine-readable non-transitory medium comprising instructions, which when implemented by one or more processors, perform the following operations:

receive a request from an interested party to predict a probability of a network activity associated with a network site;

analyze historical data associated with a domain name of the network site, the historical data including one or more past network activities associated with the network site;

based on the analysis of the historical data for the domain name, determine the probability of the network activity on the network site in future;

compare the probability to a predetermined threshold probability; and based on the comparison, selectively take a variable action concerning the network site.

* * * * *